(12) United States Patent
Stallings et al.

(10) Patent No.: US 10,110,703 B2
(45) Date of Patent: Oct. 23, 2018

(54) DYNAMIC RUNTIME MODULAR MISSION MANAGEMENT

(71) Applicant: Raytheon Company, Waltham, MA (US)

(72) Inventors: Jared D. Stallings, Denver, CO (US); Jared B. Dorny, Aurora, CO (US); Michael A. Young, Parker, CO (US); Michael P. Highfill, Parker, CO (US); Rob J. Lawrence, Highlands Ranch, CO (US)

(73) Assignee: Raytheon Company, Waltham, MA (US)

( * ) Notice: Subject to any disclaimer, the term of this patent is extended or adjusted under 35 U.S.C. 154(b) by 351 days.

(21) Appl. No.: 14/725,239

(22) Filed: May 29, 2015

(65) Prior Publication Data

US 2016/0352864 A1 Dec. 1, 2016

(51) Int. Cl.
*G06F 15/16* (2006.01)
*H04L 29/08* (2006.01)

(52) U.S. Cl.
CPC ............ *H04L 67/34* (2013.01); *H04L 67/125* (2013.01); *H04L 67/141* (2013.01)

(58) Field of Classification Search
USPC ....................................... 709/228, 200, 223
See application file for complete search history.

(56) References Cited

U.S. PATENT DOCUMENTS

| | | | | |
|---|---|---|---|---|
| 9,529,572 B1* | 12/2016 | Totale | ................ | G06F 9/44505 |
| 2007/0282951 A1* | 12/2007 | Selimis | ................... | H04L 67/06 709/205 |
| 2011/0173235 A1* | 7/2011 | Aman | ................ | A63B 24/0021 707/792 |
| 2013/0031260 A1* | 1/2013 | Jones | ................. | H04L 63/0853 709/228 |
| 2013/0132466 A1* | 5/2013 | Miller | .................... | H04L 67/02 709/203 |

* cited by examiner

*Primary Examiner* — El Hadji Sall
(74) *Attorney, Agent, or Firm* — Renner, Otto, Boisselle & Sklar, LLP

(57) ABSTRACT

There is a mission management system includes core software modules instantiable, configurable, and deployable at runtime to complete a mission objective. The system also includes asset platforms directable to complete the mission objective or another mission objective. An operational node is further included for instantiating and configuring the core software modules at runtime to direct the asset platforms to complete the mission objective or the another mission objective. The asset platforms are connectable to establish a session with the operational node to enable the direction. The configured software modules are migratable between the operational node and the asset platforms at runtime. A computer-readable medium is active across the system to provide architecture and processor-executable instructions for the instantiation, configuration, and deployment of software modules.

19 Claims, 7 Drawing Sheets

DYNAMIC RUNTIME MODULAR MISSION MANAGEMENT

FIELD OF THE INVENTION

The present invention relates generally to mission management software, and more particularly to software for executing core software modules to complete a mission, such as a tactical military mission, using one or more asset platforms having a plurality of resources.

BACKGROUND

Mission management and command and control systems provide control of asset platforms in a mission setting to enable execution of a mission. A mission may be a civilian mission, military mission, or combination thereof. In the case of a military mission, asset platforms may include unmanned aerial vehicles (UAVs), unmanned ground vehicles (UGVs), unmanned underwater vehicles (UUVs), satellites, etc. The type of control provided includes various tasking and deploying commands and various resource planning and scheduling commands, in addition to other mission specific directing of the one or more asset platforms.

Typical mission management systems are often specific to a single domain or capability and require extensive customization based on the customer and/or the particular mission. The typical systems often require complex hardware and/or software that is unique to the asset platform being tasked and deployed. Separate hardware and/or software is required for the control of a different asset platform.

Consequently, typical mission management systems are often architecturally difficult to reuse or extend, and often allow only for operations to occur at a low level such as vehicle control rather than at a high mission execution level. These systems are specific to a single domain, capability, or asset platform and lack interoperability within and between domains, capabilities and/or resources. As a result, such systems are often costly and development intensive, and are not responsive to a dynamic tempo of modern strategic and tactical missions having changing conditions and numerous heterogeneous resources available to support the problem.

SUMMARY OF THE INVENTION

The present invention provides a mission management system for accomplishing a mission using asset platforms that overcomes many or all of these drawbacks. The system includes core software modules that can be instantiated, configured, and deployed at runtime, rather than at development time. Generally, no preexisting knowledge of the asset platforms directed via the deployment of the software modules is required. When brought together at runtime, the modules "plug into" the modular architecture, discover each other, and enable mission management of the connected asset platforms. The modules can be employed to support various operational paradigms. This can include an autonomous deployment where the modules are plugged into an autonomous workflow engine or a more centralized, user-managed environment where the same modules are plugged into a user-managed mission management workflow engine.

The mission management system includes core software modules instantiable, configurable, and deployable at runtime to complete a mission objective. The system also includes asset platforms directable to complete the mission objective or another mission objective. An operational node is further included for instantiating and configuring the core software modules at runtime to direct the asset platforms to complete the mission objective or the another mission objective. The asset platforms are connectable to establish a session with the operational node to enable the direction. The configured software modules are migratable between the operational node and the asset platforms at runtime. A computer-readable medium is active across the system to provide architecture and processor-executable instructions for the instantiation, configuration, and deployment of core software modules.

According to one aspect of the invention, a mission management system for accomplishing a mission includes core software modules instantiable at runtime, configurable at runtime, and deployable at runtime to complete a mission objective of the mission. Also included are asset platforms directable to complete one or more mission objectives. Further included is an operational node for instantiating and configuring the core software modules at runtime, and for deploying the configured software modules at runtime to direct the asset platforms to complete the one or more mission objectives, where the asset platforms each are connectable to establish a session with the operational node to enable the direction of the asset platforms by the operational node, and where the configured software modules are migratable between the operational node and the asset platforms at runtime.

An additional core software module may be instantiable and configurable at runtime at the asset platforms.

The additional configured software module may be migratable between the asset platforms and the operational node at runtime.

The configured software modules may be deployable autonomously by the receiving asset platforms at runtime.

The operational node may be disconnectable from the system at runtime, resulting in the purging from the system of configured software modules being deployed at the operational node.

The mission management system may further include an auxiliary operational node addable to the system at runtime to increase operational capabilities.

The mission management system may further include an additional asset platform addable to the system at runtime via establishment of a session between the additional asset platform and the operational node of the system to increase operational capabilities.

The mission management system may further include first and second respectively heterogeneous asset platforms.

The mission management system may further include an auxiliary core software module migratable into the system at runtime at the operational node.

According to another aspect of the invention, there is a computer-readable medium active across a system of one or more operational nodes and one or more asset platforms. The computer-readable medium has predetermined instantiable and configurable core software modules and processor-executable instructions implementable to complete a mission using asset platforms. The instructions include (a) instantiating core software modules at an operational node, (b) configuring the instantiated software modules at runtime at the operational node, (c) establishing a session at runtime between asset platforms and the operational node, (d) deploying one of the configured software modules at runtime at the operational node, the deploying including directing one of the asset platforms to complete an objective of the mission, (e) migrating another one of the configured software modules at runtime from the operational node to the one or another of the asset platforms, and (f) deploying the another one of the configured software modules at runtime at the one or the another of the asset platforms.

The one and the another of the asset platforms may be respectively heterogeneous asset platforms.

The instructions may further include directing the one or the another of the asset platforms at runtime to autonomously execute the another one of the configured software modules.

The instructions may further include directing the one or the another of the asset platforms at runtime to relinquish autonomous control.

The instructions may further include establishing a session at runtime between the operational node and an auxiliary asset platform.

According to yet another aspect of the invention, there is a computer-implemented method for accomplishing a mission, using one or more asset platforms for carrying out the mission, the one or more asset platforms being controlled via one or more operational nodes. The method includes the steps of (a) receiving from the one or more asset platforms identification information concerning the one or more asset platforms at runtime, (b) establishing a session between each of the one or more asset platforms and the one or more operational nodes at runtime, and (c) populating control software at each of the one or more operational nodes with instances of one or more core software modules, the instantiated software modules being received at each operational node and thereafter configured with mission parameters at runtime.

The computer-implemented method may further include the step of populating control software at one of the one or more asset platforms with one or more instantiated software modules at runtime for deployment by the one of the one or more asset platforms.

The computer-implemented method may further include the step of configuring at the one of the one or more asset platforms the one or more instantiated software modules with mission parameters at runtime.

The computer-implemented method may further include the step of populating control software at one of the one or more asset platforms with one or more configured software modules at runtime for deployment by the one of the one or more asset platforms, the one or more configured software modules being migrated from the one or operational nodes at runtime.

The computer-implemented method may further include the step of discovering and establishing a session between an auxiliary asset platform and the one or more operational nodes at runtime.

The one or more asset platforms may include heterogeneous asset platforms.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF DRAWINGS

The accompanying drawings, which are incorporated in and constitute a part of the specification, illustrate various example systems, methods, and so on, that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

The principles of the present application have general application to a mission management system for managing tactical military missions, and thus will be described below chiefly in this context. It will be appreciated, however, that the mission management system may be applicable to non-tactical military missions, such as the delivery of emergency supplies, and also to civilian missions, such as the fulfillment of a plurality of deliveries or the deployment of a fleet of construction equipment.

An exemplary mission management system according to the disclosure supports dynamic runtime modularity allowing software modules to be brought together dynamically during runtime as needed. As used herein, runtime refers to the dynamic loading, migrating, and deploying of software modules during program execution and also to the execution of associated processor-executable instructions during program execution.

The system generally provides the user with the ability to bring together modular pieces of mission management functionality, including command and control, to match mission needs during runtime execution. The user may not be aware of the use of the modular functionality in cases where software of the system may determine what modular pieces to bring together to meet the needs of the tactical user. The user may be any individual or group tasked with executing a mission, and the user may change during the mission. Via the mission management system of the invention, the user is provided with instantiable, migratable and configurable software modules and flexible plug-and-play functionality of both operational nodes and asset platforms, which may result in decreased cost and development time of software, firmware and/or hardware required to use asset platforms in completion of a mission.

Figure 1:
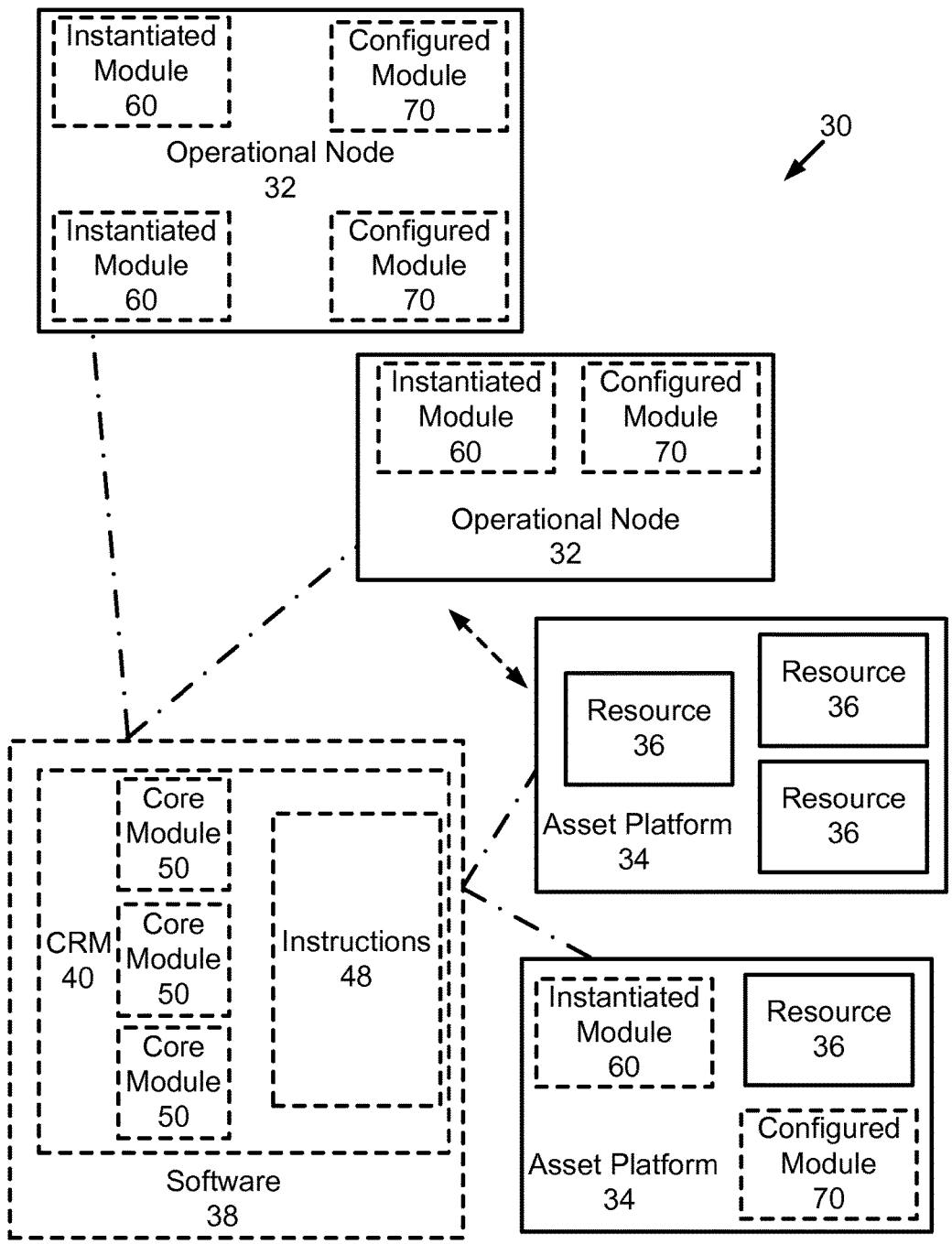
FIG. 1 illustrates an exemplary schematic representation of a mission management system according to the invention.

Turning now to FIG. 1, an exemplary mission management system 30 is schematically represented. The mission management system 30 may be used for any suitable mission, such as the surveillance of enemy combatants, in one example. The mission management system 30, also herein referred to as the MMS 30, includes a network of one or more operational nodes 32 for directing and/or controlling one or more asset platforms 34 having one or more resources 36. The resources 36 are ultimately controlled to achieve an associated mission, such as the surveillance of multiple enemy combatants. Communicatively connecting the operational nodes 32 and the asset platforms 34 is mission management software 38 having a computer-readable medium 40, also herein referred to as the CRM 40, which includes processor-executable instructions 48, also herein referred to as instructions 48, for enabling the carrying out of a mission. The MMS 30 includes the necessary software, firmware and hardware for providing an operating environment for the mission management software 38, including associated processors.

Operational nodes 32 are the controlling entities connected in the network and running the exemplary mission management software 38. An operational node 32 may be a single person having an associated interface, such as an operative acting in the field. Alternatively, an operational node 32 may be a larger entity such as a forward operating base. Exemplary operational nodes 32 may include traditional platform operations centers and also forward operating bases, mobile operating bases, edge user devices, etc. In the surveillance paradigm, an exemplary operational node 32 may be a scout team of one or more operatives tasking asset platforms to obtain information on enemy combatants in the field.

Each operational node 32 is a "pluggable" entity, such that instantiated and/or configured software modules may be migrated between operational nodes 32 and asset platforms 34, to be further discussed. As used herein, migration of software modules refers to the closing or shutting down of a previously instantiated and configured software module at a first entity and the opening of another copy of the software module at a second entity. The opening includes instantiating and configuring the software module such that it is in the same state, such as having already configured parameters, as the copy of the software module previously closed at the first entity.

Each operational node 32 has one or more suitable interfaces allowing for directing control of the asset platforms 34 and for running the mission management software 38. The interface may include any device having a processor for the executing of processor-executable instructions 48. For example, an interface may be a phone, tablet, computer, etc. Each interface may include a suitable display portion such as a screen with keys for enabling a physical interface between the live entity and the software 38 of the operational node 32. Further, each operational node 32 will be configured to run the mission management software 38. For example, each of the operational nodes 32 may have hardware and or software having the same base level of functionality, such as the ability to run JAVA or another computing platform, for example.

Each operational node 32 also includes communication hardware for communicatively connecting to the network of other operational nodes 32 and asset platforms 34. The communication hardware may include a network interface card, wireless antenna, wired communication port, etc. for any combination of wired or wireless communication. The communication hardware may be integral with the associated interface and processor or may be disposed in a separate device suitably communicatively connected via wire or wirelessly to the interface.

Asset platforms 34 controlled by the operational nodes 32 may include UAVs, UGVs, UUVs, satellites, etc. The asset platforms 34 controlled may by heterogeneous respectively, and thus may have different manufacturers and/or processor types. As used herein, the term heterogeneous refers to components or entities different form one another, such as by manufacturer, processor type, internal componentry, internal logic, etc.

Each asset platform 34 may have one or more different types of resources or even heterogeneous resources from different manufacturers or having different internal componentry. For example, asset platform resources 36 may include cameras, radar devices, jamming devices, munitions, etc. In the surveillance paradigm, one asset platform 34 and associated resources 36 may be a short range UAV having a high resolution camera and a separate infrared camera. Another example may be a low-orbit satellite having a long-range camera.

Each asset platform 34 is a "receiving" entity for the "pluggable" software modules, such that instantiated and/or configured software modules may be migrated between operational nodes 32 and asset platforms 34, to be further discussed. Each asset platform 34 includes a processor for the executing of processor-executable instructions 48 and running of the mission management software 38. Each asset platform 34 also includes communication hardware for communicatively connecting to the network of other asset platforms 34 and operational nodes 32. The communication hardware may include a network interface card, wireless antenna, wired communication port, etc. for any combination of wired or wireless communication. Like the operational nodes 32, it will be appreciated that each asset platform 34 will be configured to run the mission management software 38. For example, each of the asset platforms may have hardware and or software having the same base level of functionality, such as the ability to run JAVA or another computing platform, for example.

Turning next to the mission management software 38, the software provides a runtime infrastructure or framework in which the operational nodes 32 and asset platforms 34 may communicate. The software 38 is run on the processor of each of the operational nodes 32 and asset platforms 34 and may interface with the associated processor of each of these networked entities. The software 38 on each entity may run separated from or connected to the software 38 on other entities in the MMS 30. The software 38 is be configured to run on one or more computing platforms, such as JAVA, for example.

The software 38 has the computer-readable medium 40, which may include one or more predetermined core software modules 50. The core software modules 50 are instantiable, configurable, and deployable, collectively herein referred to as executable, to enable completion of mission objectives of a mission for which the mission management system 30 is being used. In some embodiments, core software modules 50 alternatively or additionally may be stored in a data server that may be accessed by the software 38. The data server may be located at one of the operational nodes 32, asset platforms 34, or at a separate data storage location.

The core software modules 50 represent pluggable capabilities and commands that provide basic functions, described generally as workflow management, inter- and intra-process communications, data stores, etc. More particularly, exemplary core software modules 50 may include modules for tasking, task decomposing, planning, platform health, platform status, mission health, mission status, scheduling, giving or taking control, taking or relinquishing control, opportunity generation, constraint generation, constraint validation, resource-specific capabilities, etc. In the case of the surveillance paradigm, exemplary core software modules may include directing of a UAV asset platform, use of a camera resource, and/or giving of autonomous control for tracking a target.

While the core software modules 50 remain within the mission management software 38 in the depicted embodiment, each core software module 50 may be instantiated individually or in groups, such as at an operational node 32 or asset platform 34. Instantiation as used herein includes the creation of an instance or copy of the "original" core software module 50 and the population of the associated software 38 with the instantiated software module 60, e.g., the loading of the instantiated software module 60. The core software modules 50 may be instantiated and configured at any suitable location running the mission management software 38. In other embodiments, the core software modules 50 may be migratable to the operational nodes 32, though this may be less efficient due to the associated loss of reusability. In the case of the surveillance paradigm, the camera use core software module may be instantiated multiple time for use with each of the camera of the UAV and the camera of the satellite.

An instantiated software module 60 may be configured with one or more mission-specific parameters related to a particular mission paradigm to create a configured software module 70. The configured software module 70 may or may not be further configured at a later time depending on the particular module. Accordingly, as used herein, a configured software module 70 often refers to a software module that has been both instantiated and configured.

The configuration may take place at instantiation or at a later time, and may be an automatic process, a manual entry process, or a combination thereof. Exemplary mission parameters used for configuration may include movement parameters, prioritization parameters, timing parameters, pointing constraints, rules of engagement, contingency plans, etc. With respect to the surveillance paradigm, the instantiated camera use software module may be configured with resolution and range parameters, for example.

Both the instantiation and the configuration of the software modules may occur at runtime to enable continuous adjustment of the functioning and control of the varying asset platforms 34, and to enable for variations and changes in a dynamic mission using the asset platforms 34 to complete mission objectives. For example, a new capability or functionality may be added to the MMS 30 at runtime during a mission, such as addition of a listening device of the UAV asset platform in the surveillance paradigm.

The associated pluggable core software modules are dynamically instantiated into the appropriate operational node 32 or nodes 32 that support operations of that capability or functionality, or that has control of an asset platform 34 having a resource 36 with the particular capability of functionality. For example, directional tasking and recording software modules may be instantiated and configured at an operational node 32 controlling the UAV asset platform in the running example. The instantiating of the associated software modules may be automatic or manually controlled, but preferably automatic. In such case, the resource 36 is immediately available to support the mission.

In connection with the runtime infrastructure of the mission management software 38, the instantiated software modules 60 and the configured software modules 70 may be migrated to any other entity connected to the infrastructure. The migration includes migration between operational nodes 32, between asset platforms 34, and between an operational node 32 and an asset platform 34. As previously mentioned, migration as used herein refers to the closing or shutting down of a previously instantiated and configured software module at a first entity (operational node 32 or asset platform 34) and the opening of another copy of the software module at a second entity. The opening includes instantiating and configuring the software module such that it is in the same state, such as having already configured parameters, as the copy of the software module previously closed at the first entity.

The migration may occur at runtime to enable varying usage of asset platform resources 36 by the varying connected operational nodes 32. Thus, when a dynamic mission requires an operational node 32 to adjust its role or an asset platform 34 to use additional resources 36 not presently in use, corresponding core software modules 50 may be migrated among the network of entities connected via the mission management software 38. For example, control of the exemplary UAV asset platform may be given to a secondary surveillance team operational node 32 in the field.

Further, while an operational node 32 can instantiate and configure a core software module 50 in this manner, an asset platform 34 also may have the ability to instantiate and configure modules autonomously, such as to operate a previously unused resource 36 at runtime. The respective asset platform 36 may be operating the previously unused resource 36 as part of its autonomous control or at the direction of an operational node 32, such as a node 32 executing a tasking software module.

Regarding the autonomous control, an operational node 32 controlling an asset platform 34 may give or take such autonomous control with respect to the asset platform, such as via deployment of a corresponding software module. Likewise, the asset platform 34 may have the capability of automatically operating autonomously under certain conditions, such as during certain flight maneuvers, during a period of communications blackout, etc. The asset platform 34 may execute a corresponding software module to assume and later relinquish such autonomous control, for example. In another embodiment, processor-executable instructions 48 may be executed at the operational node 32 or asset platform 34 to direct the giving/taking of autonomous control sans use of a software module.

For example, the UAV asset platform of the surveillance paradigm may have a motion tracking camera, and in the case that the position of the enemy combatants changes unexpectedly, autonomous control may be given to the UAV asset platform by an operational node. In another embodiment, autonomous control may be taken by the UAV asset platform without permission of the operational node, in the case that the UAV has predetermined permission to take such control, for example.

After completion of a mission objective using the previously unused resource 36, or after the resource 36 is no longer needed, corresponding modules, such as configured modules 70, may be purged from the asset platform 34 and/or associated operational node 32. In this way, the corresponding software modules are no longer suing operating power and memory of the asset platform 34 or associated operational node 32. In the case of the surveillance paradigm, the motion tracking device may no longer be required and associated software modules may be purged from the UAV asset module 34 and/or controlling operational node 32.

Likewise, an asset platform 34 or operational node 32 may disconnect from or connect to the system at runtime.

Both entity types, which assuming are running the mission management software 38, are able to be discovered by another entity of the system. The discovery may be made by way of an associated deployed software module by way of the processor-executable instructions 48 without use of a software module. For example, an operational node 32 may briefly search for available satellites passing over an area during a particular time frame.

An auxiliary asset platform 34 or operational node 32 that is discovered and added to the MMS 30 may provide additional capabilities to the system 30 at runtime during a mission. As herein referred, an auxiliary entity is one that is not previously connected to the MMS 30, whether or not it has been previously connected at another time during the associated mission. The auxiliary operational node 32 or asset platform 34 may be connected with the MMS 30 via establishment of a corresponding session.

For example, a session may be established between an auxiliary asset platform 34 and an already connected operational node 32. Any session may later be terminated allowing the operational node 32 or asset platform 34 to leave the system 30. If an operational node 32 or asset platform 34 leaves the system 30, the related software modules are preferably purged and the mission continues with the remaining capabilities.

Further, prior to addition of the auxiliary asset platform 34 to the MMS 30, the MMS 30 may not include core software modules for using the auxiliary asset platform 34 and or one or more of its resources 36. In such case, one or more core software modules 50 may be migrated from the auxiliary asset platform 34 to the MMS 30, such as being received at an operational node 32. As used in this example, migration refers to the sending to and receipt at the MMS 30 of a core software module 50 not previously existing in the MMS 30.

With respect to the running example, an auxiliary satellite asset platform having a unique resource may be discovered by the operational node 32 and a session established between the auxiliary satellite and operational node 32. At such time, core software modules 50 already existing in the MMS 30 for controlling a satellite and for using the unique resource may be instantiated and configured at the operational node 32. Alternatively, new core software modules 50 may be received at the operational node 32 after migration from the auxiliary satellite asset platform, where the new core software modules 50 are added to a "library" of core software modules 50 of the MMS 30. Once the unique resource is no longer needed, the session between the auxiliary satellite and the operational node 32 may be broken and the associated configured software modules 70 may be purged, though the new core software modules 50 may remain with the MMS 30.

Referring now generally to the MMS 30, via the use of basic core software modules 50, or even through a bundle of resource-specific software modules created to function within the infrastructure of the mission management software 38, it is not necessary to create at development time software and/or hardware directed solely to a single asset platform 34 or family of asset platforms 34. This is because the basic functionality of the core software modules 50 enables control by varied heterogeneous operational nodes 32 of varied heterogeneous asset platforms 34 and associated resources 36. Such software modules are not asset platform-specific, though some may be resource type-specific, such as generally for function of cameras, radar, etc., or even for function of a particular resource.

Accordingly, benefits of the mission management system 30 and the corresponding mission management software 38 include the ability to bring previously unknown asset platforms 34 into the mission without asset platform-specific hardware, software, or operational nodes 32. Dynamic mission changes may be implemented at runtime, relatively quickly. This is because only those software modules having capabilities and functionalities necessary to use mission-necessary asset platform resources 36 need be instantiated, configured and deployed, which may be completed at runtime due to the basic and dynamic structure of the modules and associated software 38. In other words, software at each operational node 32 assembles only those software modules needed to manage the system and to utilize the resources 36 of the asset platforms 34 within the context of the mission. In this way, control of asset platforms 34 may quickly be transferred between operational nodes 32, and back and forth between operational nodes 32 and the asset platforms 34 themselves.

Thus it is not the case that a particular operational node 32 is the only operational node 32 with the capabilities and functionality to control a particular type of asset platform 34. Rather, via use of the instantiable, configurable, deployable and migratable software modules of the mission management software 38, varying heterogeneous operational nodes 32 may control varying respectively heterogeneous asset platforms 34. Further, control may be passed between operational nodes 32, and/or multiple operational nodes 32 may each control varying resources 36 of a single asset platform 34.

Turning again to the mission management software 38 and to FIG. 1, further included are the processor-executable instructions 48 for executing the plurality of core software modules 50. The processor-executable instructions 48 may also include instructions for executing non-software module related functions. The processor-executable instructions 48 generally provide for the movement at runtime of capabilities and functions necessary to achieve a dynamically changing mission through the use of asset platforms 34. The instructions 48 are implementable to instantiate core software modules 50, configure instantiated software modules 60, and deploy the configured (and instantiated) software modules 70 to complete a mission using the asset platforms 34.

The instructions 48 are also implementable to automatically instantiate core software modules 50 necessary for using an asset platform resource 36 or for directing a newly added/connected auxiliary asset platform 34, for example. The instructions 48 are further implementable to search for and discover auxiliary operational nodes 32 or asset platforms 34. The instructions 48 enable the mission management system 30 to establish a session between one or more asset platforms 34 and one or more operational nodes 32. More than one asset platform 34 may establish a session with a single operational node 32, while more than one operational node 32 may establish a session with a single asset platform 34.

In summary, a mission management system 30 includes core software modules 50 instantiable, configurable, and deployable at runtime to complete a mission objective. The MMS 30 also includes asset platforms 34 directable to complete the mission objective or another mission objective. An operational node 32 is further included for instantiating and configuring the core software modules 50 at runtime to direct the asset platforms 34 to complete the mission objective or the another mission objective. The asset platforms 34 are connectable to establish a session with the operational node 32 to enable the direction. The configured software modules 70 are migratable between the operational node 32 and the asset platforms 34 at runtime. A computer-readable medium 40 is active across the system to provide architecture and processor-executable instructions 48 for the instantiation, configuration, and deployment of software modules.

Figure 2:
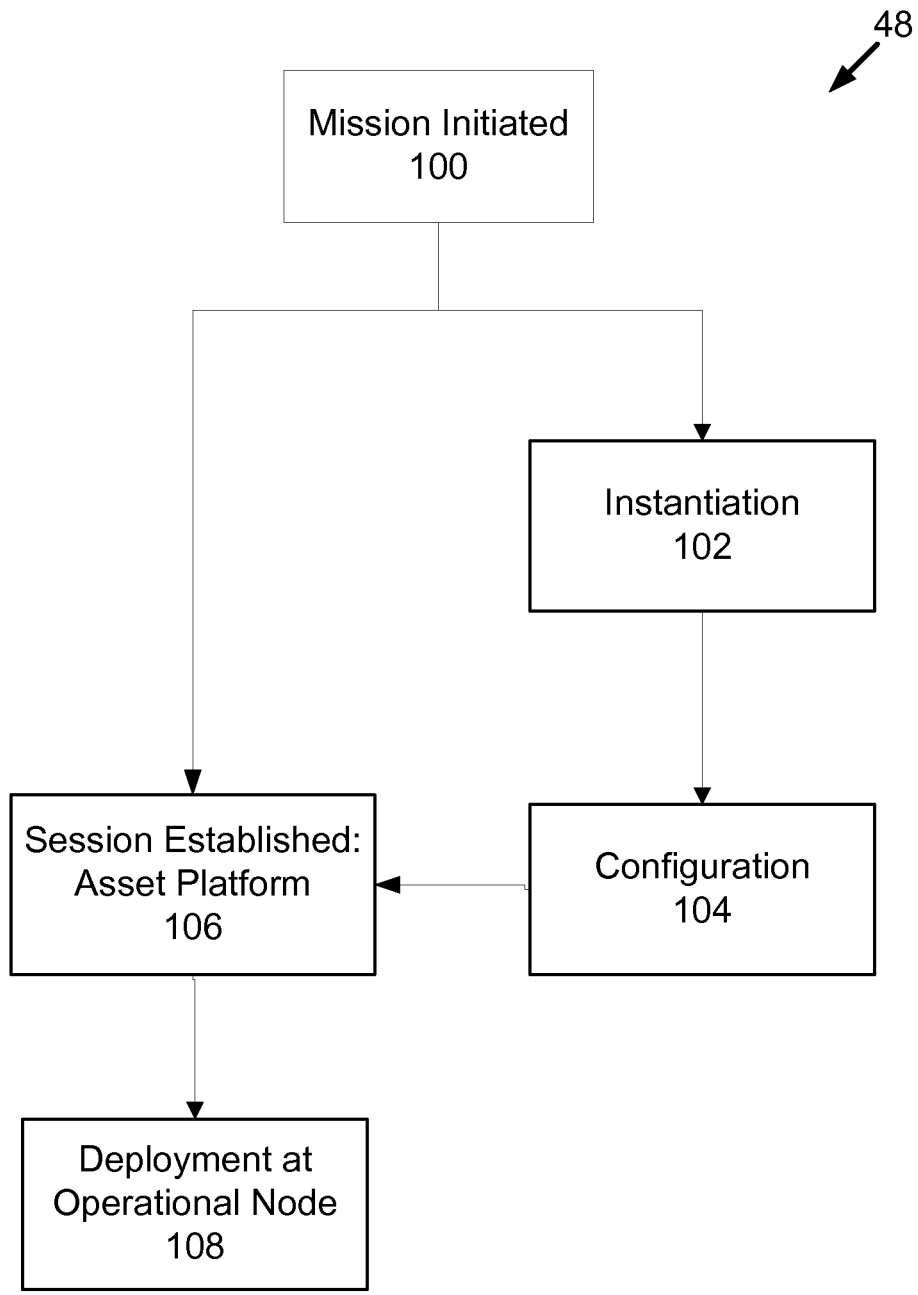
FIG. 2 illustrates an exemplary depiction of processor-executable instructions of a computer-readable medium of the mission management system of FIG. 1.
Figure 3:
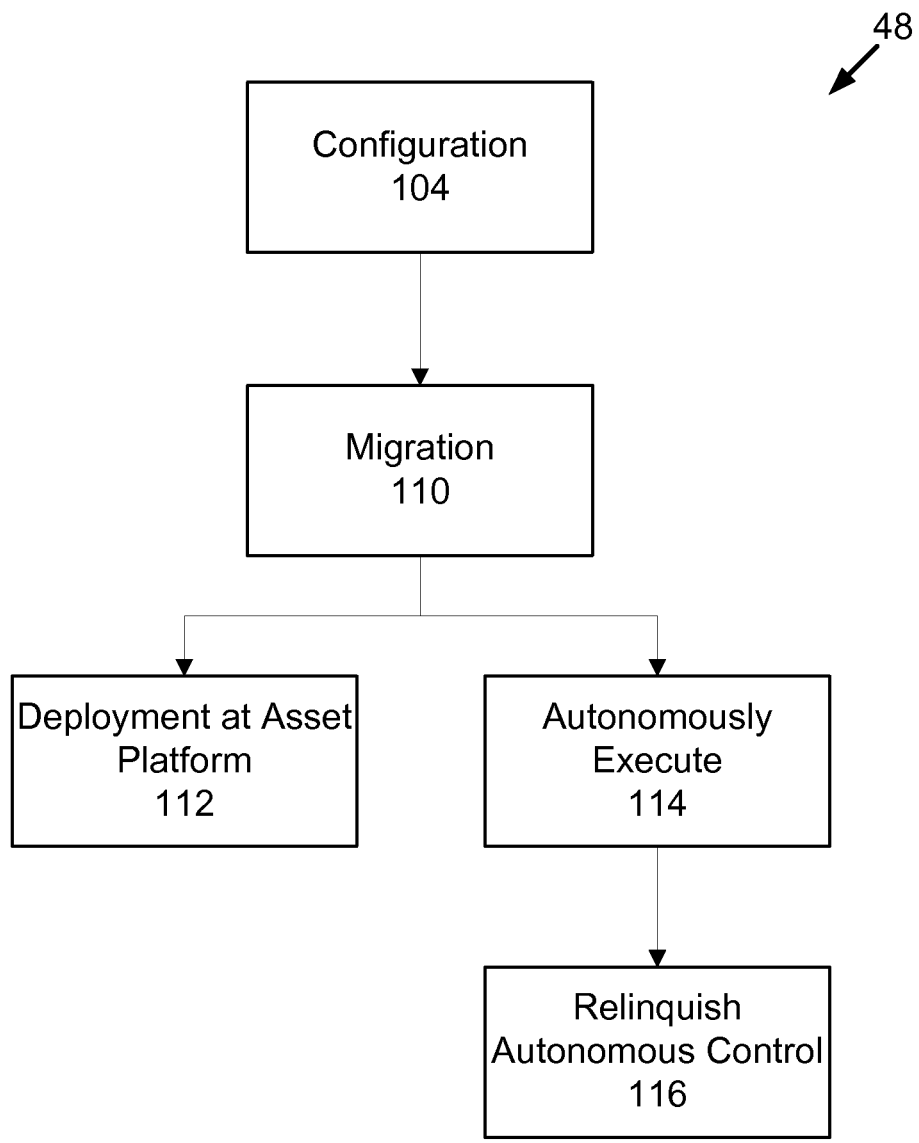
FIG. 3 illustrates another exemplary depiction of processor-executable instructions of a computer-readable medium of the mission management system of FIG. 1.
Figure 4:
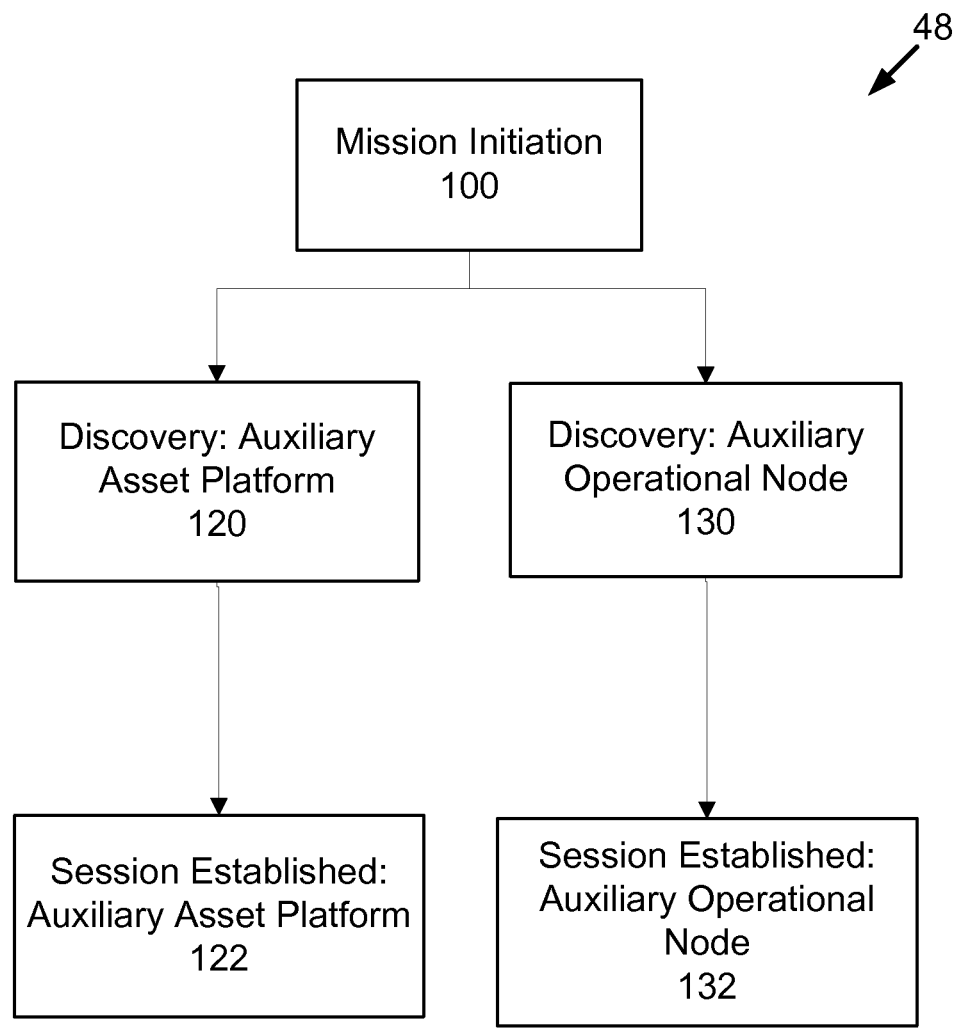
FIG. 4 illustrates yet another exemplary depiction of processor-executable instructions of a computer-readable medium of the mission management system of FIG. 1.

Turning next to FIGS. 2-4, an exemplary set of processor-executable instructions 48 implementable to complete a mission using asset platforms 34 is schematically illustrated in flow diagrams. In the flow diagrams, blocks denote "processing blocks" that may be implemented with logic. The processing blocks may represent a method step or an apparatus element for performing the method step. A flow diagram does not depict syntax for any particular programming language, methodology, or style (e.g., procedural, object-oriented). Rather, a flow diagram illustrates functional information one skilled in the art may employ to develop logic to perform the illustrated processing. It will be appreciated that in some examples, program elements like temporary variables, routine loops, and so on, are not shown. It will be further appreciated that electronic and software applications may involve dynamic and flexible processes so that the illustrated blocks can be performed in other sequences that are different from those shown or that blocks may be combined or separated into multiple components. It will be appreciated that the processes may be implemented using various programming approaches like machine language, procedural, object oriented or artificial intelligence techniques.

Referring to FIG. 2, an exemplary set of instructions 48 begins at block 100, where a mission using the exemplary MMS 30 is initiated. At block 102, core software modules 50 are instantiated at an operational node 32 of the MMS 30. At block 104, the instantiated software modules 60 are configured with mission parameters at runtime at the operational node 32.

At any time after the initiation of the mission, and not necessarily after one or both of instantiation and configuration at an operational node 32, a session is established at runtime between one or more asset platforms 34 and an exemplary operational node 32 (block 106). Once software modules are configured at the operational node 32 (block 104), one or more of the configured software modules 70 may be deployed at runtime at the operational node 32 to direct one of the asset platforms 34 to complete an objective of the mission (block 108).

Turning now to FIG. 3, additionally or alternatively, another one or more of the configured software modules 70 may be migrated at runtime from the operational node 32 to the one or another of the asset platforms 34 (block 110). Thereafter, at block 112, the another one or more of the migrated configured software modules 70 may be deployed at runtime at the one or the another of the asset platforms 34.

At block 114, the instructions 48 may include an instruction for the operational node 32 to direct the one or the another of the asset platforms 34 to autonomously execute at runtime. For example, the instructions 48 may include the executable instruction, or it will be appreciated that yet another configured software module 70 may be deployed at the operational node 32 to direct the one or the another of the asset platforms 34 at runtime to autonomously execute the another one or more of the migrated configured software modules 70. Thereafter, the instructions 48 may include an instruction for the operational node 32 to relinquish the autonomous control from the autonomously acting asset platform 34 (block 116). For example, the instructions 48 may include the executable instruction, or it will be appreciated that still another configured software module 70 may be deployed at the operational node 32 to direct the one or the another of the asset platforms 34 at runtime to relinquish the autonomous control previously given.

Referring now to FIG. 4, at any time after initiation of the mission, the instructions 48 further may include discovering an auxiliary asset platform (block 120). Thereafter, a session may be established at runtime between the auxiliary asset platform and an operational node 32 of the MMS 30 (block 122). Similarly, the instructions 48 may further include discovering an auxiliary operational node (block 130), and establishing a session at runtime between the auxiliary operational node and the MMS 30 (block 132).

Referring again generally to FIG. 1, the invention further includes a computer-implemented method for accomplishing a mission, using one or more asset platforms 34 for carrying out the mission, the one or more asset platforms 34 being controlled via one or more operational nodes 32. The method may be carried out via the implementation of processor-executable instructions 48 of an associated mission management software 38 of a corresponding MMS 30. The method includes the steps of (a) receiving from the one or more asset platforms 34 identification information concerning the one or more asset platforms 34 at runtime; (b) establishing a session between each of the one or more asset platforms 34 and the one or more operational nodes 32 at runtime; (c) populating control software 38 at each of the one or more operational nodes 32 with instances of one or more core software modules 50, the instantiated software modules 60 being received at each operational node 32 and thereafter configured with mission parameters at runtime. The one or more asset platforms may include heterogeneous asset platforms.

The method also includes the steps of populating control software 38 at one of the one or more asset platforms 34 with one or more instantiated software modules 60 at runtime for deployment by the one of the one or more asset platforms 34, and configuring at the one of the one or more asset platforms 34 the one or more instantiated software modules 60 with mission parameters at runtime.

The method further includes the steps of populating control software 38 at one of the one or more asset platforms 34 with one or more configured software modules 70 at runtime for deployment by the one of the one or more asset platforms 34, the one or more configured software modules 70 being migrated from the one or operational nodes 32 at runtime. The method may also include the step of discovering and establishing a session between an auxiliary asset platform 34 and the one or more operational nodes 32 at runtime.

Figure 5:
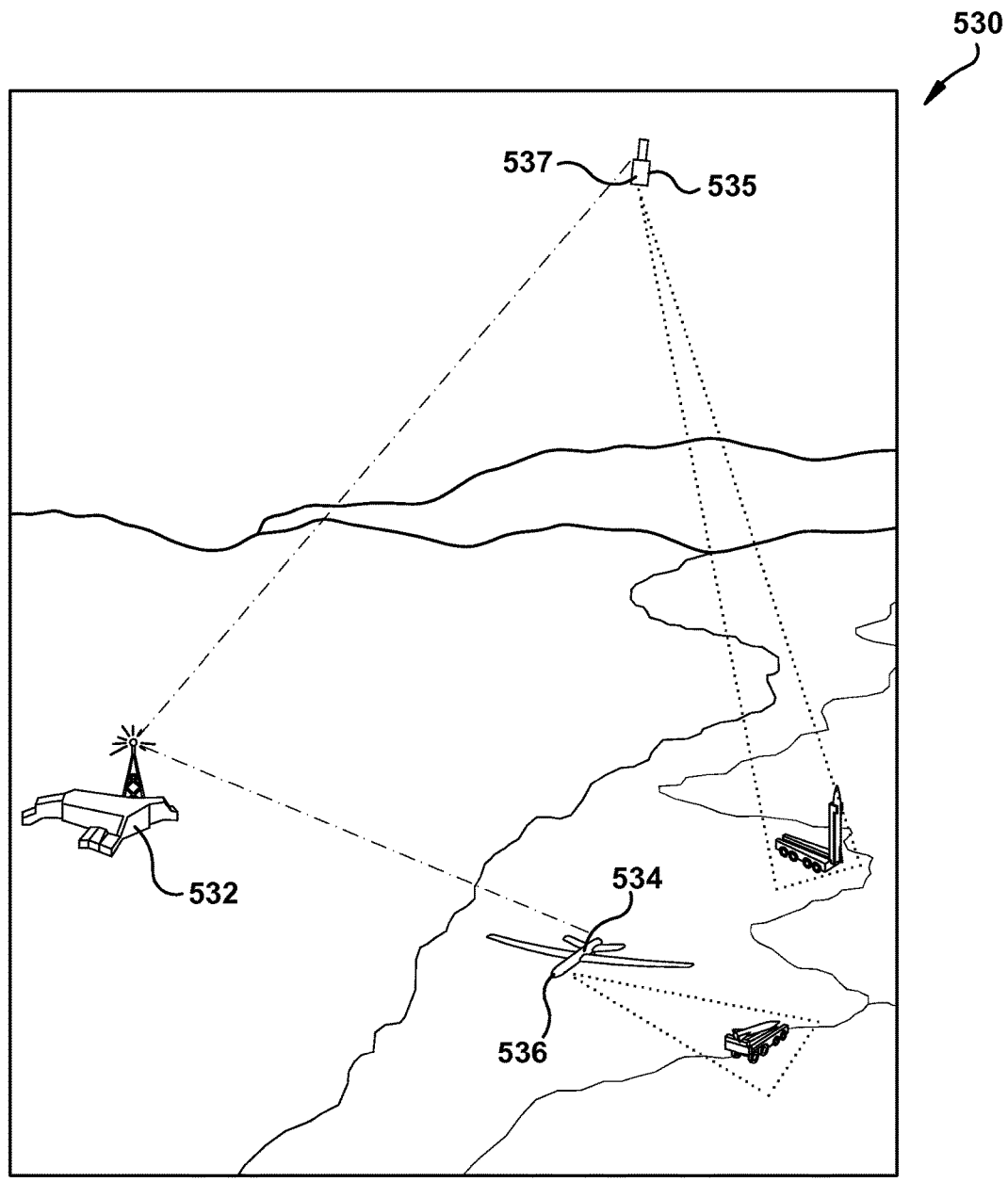
FIG. 5 illustrates an exemplary embodiment of a mission management system according to the invention.
Figure 6:
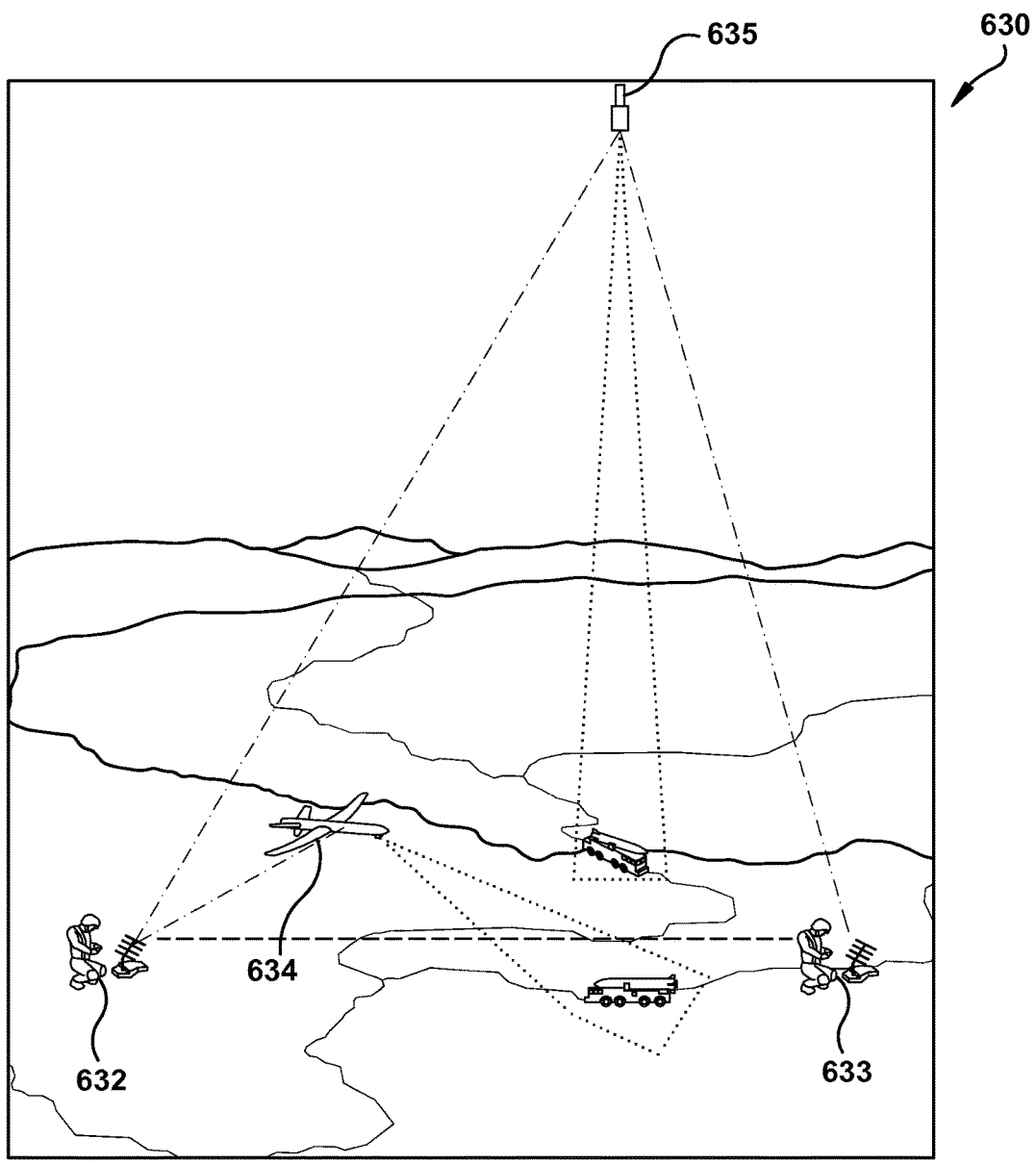
FIG. 6 illustrates another exemplary embodiment of a mission management system according to the invention.
Figure 7:
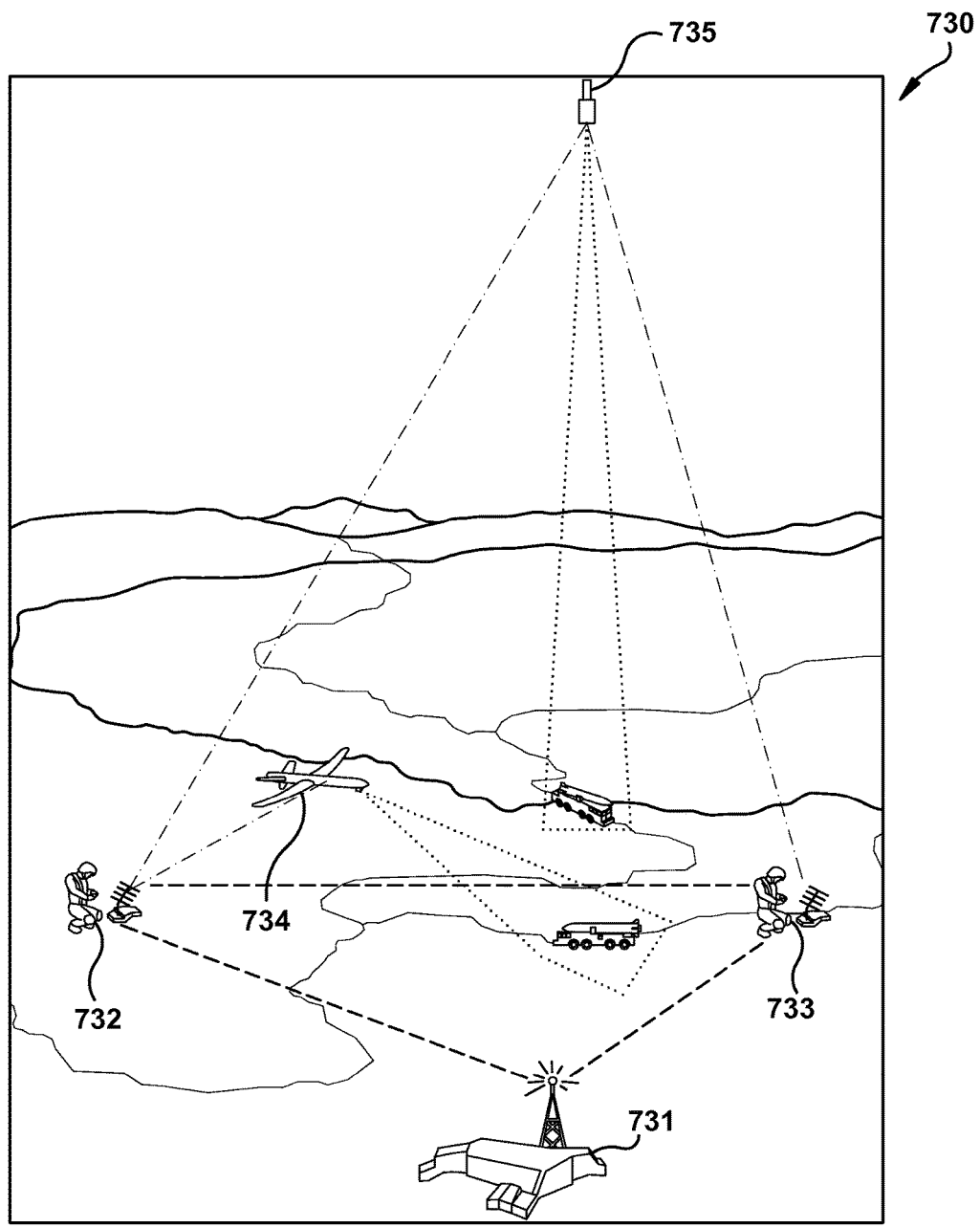
FIG. 7 illustrates yet another exemplary embodiment of a mission management system according to the invention.

Turning next to FIGS. 5-7, various embodiments of the mission management system 30 of FIG. 1 are depicted. The various embodiments depict distinct mission management paradigms under which a mission may be carried out using an exemplary mission management system of the invention. As demonstrated in the FIGS. 5-7, an exemplary mission management system of the invention allows for dynamic adjustment or control of asset platforms to achieve a mission. In particular, any of the embodiments shown in FIGS. 5-7 may be converted into the other of the embodiments at runtime via the addition of auxiliary operational nodes and/or asset models, or the subtraction of already connected operational nodes and/or asset models.

Each of the additional embodiments of FIGS. 5-7 are substantially the same as the above-referenced MMS 30, and consequently the same reference numerals but indexed by 500, 600, and 700, respectively, are used to denote aspects corresponding to similar aspects in the MMS 30. In addition, the foregoing description of the MMS 30 is equally applicable to the additional embodiments except as noted below. Moreover, it will be appreciated upon reading and understanding the specification that aspects of the additional embodiments and the MMS 30 may be substituted for one another or used in conjunction with one another where applicable.

Referring first to FIG. 5, a mission management system 530 depicts an independent mission management paradigm where an operational node acts independently. The MMS 530 includes a single operational node 532 directing two asset platforms 534 and 535. The operational node 532 is a forward operating base, while the asset platform 534 is a UAV and the asset platform 535 is a satellite. The asset platforms 534 and 535 include resources 536 and 537, such as a camera of the UAV and imaging equipment of the satellite, respectively.

Each of the operational node 532 and asset platforms 534 and 535 are running a mission management software. The operational node 532 may deploy configured software modules to direct and/or control the asset platforms 534 and 535. On the other hand, either of the asset platforms 534 or 535 may be given or may take autonomous control where suitable to complete the mission.

Turning to FIG. 6, a mission management system 630 depicts a collaborative mission management paradigm where two or more operational nodes may work together to achieve a mission. As shown, two operational nodes 632 and 633 are independent operatives in the field. Each of the operational nodes 632 and 633, and the asset platforms 634 and 635, are running a mission management software having core software modules.

While the operational node 632 is independently controlling the UAV asset platform 634, each of the operational nodes 632 and 633 are shown controlling the satellite asset platform 635. Such control may be joint or alternatively only one node 632 and 633 may control the satellite asset platform 635 at a time. Each of the operational nodes 632 and 633 may deploy configured software modules 670 to control the same or different resources 636 of the satellite asset platform 635. Additionally or alternatively, control of the satellite asset platform 635 may be passed back and forth between the operational nodes 632 and 633. In another situation, the asset platform 635 may be given autonomous control by one of the operational nodes 632 and 633, while the other of the operational nodes 632 and 633 may later take back control of the asset platform 635.

Referring next to FIG. 7, a mission management system 730 depicts a centralized mission management paradigm, where one operational node completes mission objectives through direction of other operational nodes. The MMS 730 is similar to the MMS 630 of FIG. 6, with the addition of a managing operational node directing other operational nodes. As shown, a managing operational node 731 is directing operational nodes 732 and 733. The operational nodes 732 and 733 are controlling asset platforms 734 and 735. In some situations, the managing operational node 731 may send configured software modules 770 to the other operational nodes 732 and 733 for deployment by the other operational nodes 732 and 733.

While example systems, methods, and so on, have been illustrated by describing examples, and while the examples have been described in considerable detail, it is not the intention to restrict or in any way limit the scope of the appended claims to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, and illustrative examples shown or described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

What is claimed is:

1. A method of managing a mission management system at runtime, the system including an operational node and one or more physical asset platforms, the one or more asset platforms each having one or more physical resources for use in carrying out a mission with respect to a respective physical target, and the method comprising the steps of:
communicatively establishing a communicative connection between the operational node and each of the one or more asset platforms to enable direction of the one or more asset platforms by the operational node;
instantiating and configuring core software modules at runtime at the operational node, the software modules each including separate instructions for using one of the one or more resources in relation to the respective target;
deploying one or more of the configured core software modules at the operational node and deploying one or more of the configured core software modules at runtime at respective of the one or more asset platforms, wherein each of the deployments is made to direct the respective of the one or more asset platforms to act in accordance with the instructions to complete one or more mission objectives of the mission, and the one or more asset platforms configured to carry out the respective instructions by using the respective one or more resources in relation to the respective target.

2. A method of managing a mission management system at runtime to carry out a mission, the system including one or more operational nodes and one or more physical asset platforms, the one or more asset platforms each having one or more physical resources for use in carrying out a mission with respect to a respective physical target, and the method including the steps of:
instantiating core software modules at the one or more operational nodes, the software modules each including separate instructions for using one of the one or more resources in relation to the respective target;
configuring the instantiated software modules at runtime at the one or more operational nodes;
establishing a communicative connection at runtime between the one or more asset platforms and the one or more operational nodes;
deploying at least one of the configured software modules at runtime at the one or more operational nodes, the deploying including directing respective of the one or more asset platforms to act in accordance with the instructions to complete an objective of the mission, and the one or more asset platforms configured to carry out the respective instructions by using the respective one or more resources in relation to the respective target;
migrating another one of the configured software modules at runtime from the one of the one or more operational nodes to one of the one or more asset platforms; and
deploying the another one of the configured software modules at runtime at the one of the one or more asset platforms.

3. The method of claim 1, wherein the step of deploying the configured software modules at runtime includes autonomously deploying the configured software modules at the one or more asset platforms, absent user direction at runtime.

4. The method of claim 1, further including the step of disconnecting the operational node from the system at runtime, resulting in the purging from the system of the one or more configured software modules being deployed at the operational node.

5. The method of claim 1, further including connecting an auxiliary operational node to the system at runtime to increase operational capabilities of the system.

6. The method of claim 1, wherein the one or more asset platforms of the system managed include first and second respectively heterogeneous asset platforms.

7. The method of claim 1, further including the step of migrating an auxiliary core software module into the system at runtime at the operational node from a processor outside the managed system.

8. The method of claim 2, further including the step of communicatively establishing at runtime a communicative connection between the one or more operational nodes and an additional one or more physical asset platforms, and migrating one or more of the configured core software modules at runtime amongst the one or more operational nodes, the one or more asset platforms, and the one or more additional asset platforms.

9. The method of claim 2, wherein the system includes first and second respectively heterogeneous asset platforms.

10. The method of claim 2, further including the step of directing tone of the one or more asset platforms at runtime to autonomously deploy the another one of the configured software modules, absent user direction.

11. The method of claim 10, further including the step of directing the one of the one or more asset platforms at runtime to relinquish autonomous control.

12. The method of claim 2, further including the step of establishing a communicative connection at runtime between the one or more operational nodes and an auxiliary asset platform.

13. A computer-implemented method for accomplishing a mission, using one or more physical asset platforms each having one or more physical resources, for carrying out the mission with respect to a respective physical target, the one or more asset platforms being controlled via one or more operational nodes, the method comprising the steps of:
 receiving from the one or more asset platforms identification information concerning the one or more asset platforms at runtime;
 establishing a communicative connection between each of the one or more asset platforms and the one or more operational nodes at runtime; and
 populating control software at each of the one or more operational nodes with instances of one or more core software modules, the instantiated software modules being received at each operational node and thereafter configured with mission parameters at runtime, the software modules each including separate instructions for using one of the one or more resources in relation to the respective target.

14. The computer-implemented method of claim 13, further including the step of populating control software at one of the one or more asset platforms with one or more instantiated software modules at runtime for deployment by the one of the one or more asset platforms.

15. The computer-implemented method of claim 14, further including the step of configuring at the one of the one or more asset platforms the one or more instantiated software modules with mission parameters at runtime.

16. The computer-implemented method of claim 13, further including the step of populating control software at one of the one or more asset platforms with one or more configured software modules at runtime for deployment by the one of the one or more asset platforms, the one or more configured software modules being migrated from the one or operational nodes at runtime.

17. The computer-implemented method of claim 13, further including the step of discovering and establishing a communicative connection between an auxiliary asset platform and the one or more operational nodes at runtime.

18. The computer-implemented method of claim 13, wherein the one or more asset platforms include heterogeneous asset platforms.

19. The method of claim 1, wherein the operational node is a physically separate entity from the one or more asset platforms.

* * * * *